United States Patent [19]

Satake et al.

[11] Patent Number: 5,518,829
[45] Date of Patent: May 21, 1996

[54] SOLID OXIDE ELECTROLYTE FUEL CELL HAVING DIMPLED SURFACES OF A POWER GENERATION FILM

[75] Inventors: Tokuki Satake, Kobe; Hitoshi Miyamoto, Takasago; Kiyoshi Watanabe; Shigeaki Yamamuro, both of Kobe, all of Japan

[73] Assignee: Mitsubishi Jukogyo Kabushiki Kaisha, Tokyo, Japan

[21] Appl. No.: 390,485

[22] Filed: Feb. 17, 1995

[30] Foreign Application Priority Data

Mar. 4, 1994 [JP] Japan .................................. 6-034416

[51] Int. Cl.$^6$ .............................. H01M 8/10; H01M 8/12
[52] U.S. Cl. .................................. 429/30; 429/32; 429/33
[58] Field of Search ................................ 429/30, 32, 33

[56] References Cited

U.S. PATENT DOCUMENTS 5,169,731 12/1992 Yoshimura et al. ...................... 429/30
5,213,910 5/1993 Yamada ...................... 429/32

OTHER PUBLICATIONS

Japanese Laid-Open Utility Model Application No. 4-8259 Jan. 24, 1992.
Patent Abstracts of Japan, vol. 15, No. 40 (E-102), 30 Jan. 1991; JPA02276166; 13 Nov. 1990; abstract.
Patent Abstracts of Japan, vol. 016, No. 255 (E-1214), 10 Jun. 1992; JPA04056075; 24 Feb. 1992; abstract.

*Primary Examiner*—Stephen Kalafut
*Assistant Examiner*—Richard H. Lilley, Jr.
*Attorney, Agent, or Firm*—Wenderoth, Lind & Ponack

[57] ABSTRACT

The invention relates to a solid oxide electrolyte fuel cell (SOFC) which can be used as a cell for water electrolysis, $CO_2$ electrolysis and other electrolyses, as well as for power generation. In a SOFC in which both surfaces of a power generation film comprising three layers of a fuel electrode, a solid electrolyte, and an oxygen electrode are formed with a number of dimples, the thickness of a yttria-stabilized zirconia film that constitutes the solid electrolyte is 5 to 100 μm, and the thickness of an oxygen electrode material that constitutes the oxygen electrode which is provided on one side of the yttria-stabilized zirconia film is 200 to 2,000 μm. As a result, the power generation performance can be greatly improved and a sufficiently strong oxygen electrode material prevents a thin yttria-stabilized zirconia film from being damaged in manual operations.

2 Claims, 4 Drawing Sheets

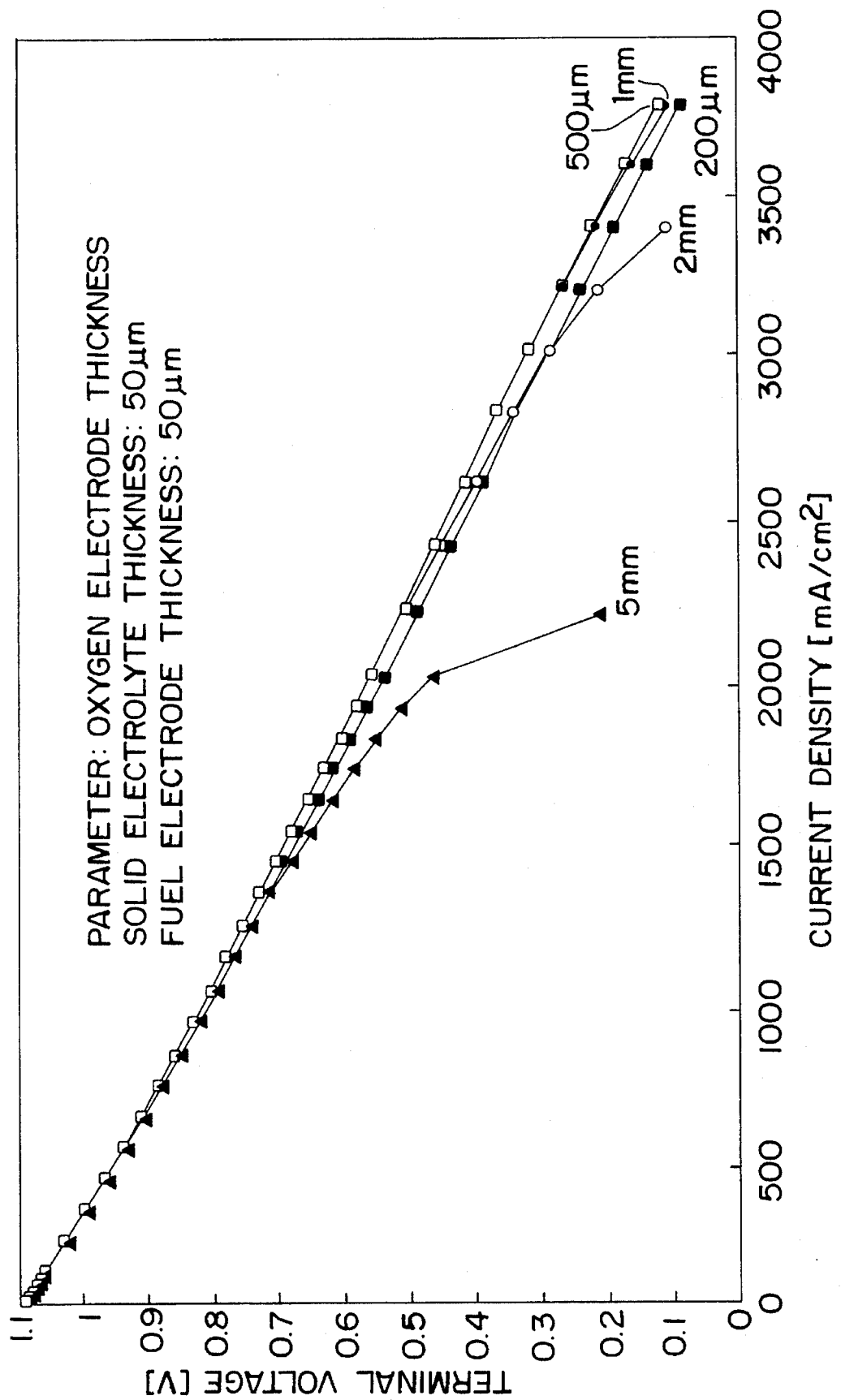

SOLID OXIDE ELECTROLYTE FUEL CELL HAVING DIMPLED SURFACES OF A POWER GENERATION FILM

BACKGROUND OF THE INVENTION

1. Technical Field

The present invention relates to a solid oxide electrolyte fuel cell (SOFC) and, more specifically, to a SOFC which can be used as a cell for water electrolysis, $CO_2$ electrolysis and other electrolyses, as well as for power generation.

2. Background Technology

A power generation film of a non-cylindrical SOFC (also called a planar or integrally layered SOFC) is composed of three layers of a solid electrolyte, an oxygen electrode and a fuel electrode. Because the respective layers are made of different materials, they have different thermal expansion coefficients at 950°–1,000° C. that is said to be an optimum temperature range for power generation, or different thermal contraction coefficients when they cool down after power generation. Therefore, it is difficult to sinter the three layers while forming a unified body.

Conventionally, a film of yttria-stabilized zirconia (YSZ) is used as the solid electrolyte. To obtain a fine YSZ film, firing is performed at 1,400° C. or more. The above-mentioned difficulty in sintering the three layers is due to a phenomenon that when the YSZ film unified with the oxygen electrode is fired at the above temperature, an insulating material of $La_2Zr_2O_7$ is formed at the boundary between the YSZ film and the oxygen electrode.

In view of the above, another method is taken in which a YSZ film to constitute the solid electrolyte is fired in advance at 1,400° C. or more, and the oxygen electrode is formed by applying an oxygen electrode material to the YSZ film by slurry coating, spray coating or some other method and then again firing it at 1,300° C. or less, which temperature does not cause formation of any insulating material.

However, the above method requires manual operations to, for instance, coat the oxygen electrode material on the YSZ film fired in advance and fire the coated oxygen electrode material. If the YSZ film is too thin, it may be broken in those manual operations.

To avoid such a problem, conventionally, the thickness of the YSZ film is increased to 100–500 μm, to thereby make the YSZ film strong enough to endure at least when it is carried or where a multilayered cell is formed.

An oxygen electrode material and a fuel electrode material are applied to both surfaces of the YSZ film having such a thickness by screen printing, spray coating, brush coating, or the like at a thickness of 20–50 μm, to thereby form a power generation film consisting of three layers.

Conventionally, in the above manner, the YSZ film as the solid electrolyte that constitutes the power generation film of the non-cylindrical SOFC functions in itself as a structural body.

On the other hand, yttria-stabilized zirconia (YSZ) for the YSZ film as the solid electrolyte has a conductivity of about 0.16–0.17 $Scm^{-1}$, which is much smaller than 20–200 $Scm^{-1}$ of the oxygen electrode material that constitutes the oxygen electrode and 500–1,000 $Scm^{-1}$ of the fuel electrode material that constitutes the fuel electrode. To improve the power generation performance, it is desired to make the YSZ film as thin as possible.

However, in the conventional power generation film, the solid electrolyte (YSZ film) cannot be made thinner than a certain limit, because, as described above, the solid electrolyte itself needs to function as a structural body.

SUMMARY OF THE INVENTION

In view of the above problems, an object of the present invention is to provide a SOFC with a thinner solid electrolyte film.

The present invention will be hereinafter described.

A SOFC having a dimple structure to which the invention is applied has a configuration shown in FIGS. 1 and 2. FIG. 1 is an exploded perspective view and FIG. 2 is an enlarged sectional view taken along line A—A in FIG. 1.

In these figures, reference numeral 11 denotes a power generation film; 12, a fuel electrode; 13, a solid electrolyte; 14, an oxygen electrode; 15A, dimple protrusions on the hydrogen electrode side; 15B, dimple protrusions on the oxygen electrode side; 16A–16C, interconnectors.

As shown in FIGS. 1 and 2, the power generation film 11 is composed of the three layers, i.e., the fuel electrode 12, solid electrolyte 13 and oxygen electrode 14. The top interconnector 16A is electrically connected to the dimple protrusions (hydrogen electrode side) 15A of the power generation film 11 with a conductive adhesive, and the central interconnector 16B is electrically connected to the dimple protrusions (oxygen electrode side) 15B of the power generation layer 11 with a conductive adhesive.

To attain the above object, according to the invention, the thickness of a YSZ (yttria-stabilized zirconia) film as the solid electrolyte 13 is made in the range of 5 to 100 μm and the thickness of an oxygen electrode material that constitutes the oxygen electrode 14 which is provided on one side of the YSZ film is made in the range of 200 to 2,000 μm.

It is preferred that the YSZ film be as thin as possible, because better power generation performance is obtained by a thinner YSZ film by virtue of a low ion conduction resistance. However, if the YSZ film is too thin, manufacturing defects become more likely to occur and the ion transport efficiency may decrease. For this reason, the lower limit of the YSZ film thickness is set at 5 μm.

On the other hand, the upper limit of the YSZ film thickness is set at 100 μm, because at the present time the minimum profitable cell power generation area in land-use power generation such as cogeneration is considered to be 100 mm×100 mm and, in such a case, the possibility of breaking the solid electrolyte 13 in handling it singly is considered very small when it is not thicker than 100 μm.

The reason why the oxygen electrode material that constitutes the oxygen electrode 14 which is provided on one side of the YSZ film is made in the range of 200 to 2,000 μm is to use the oxygen electrode material as a supporting structural body with the YSZ film thinned to 100 μm or less. The lower limit is set at 200 μm, because it is the minimum necessary thickness for the oxygen electrode material to have the same strength as the solid electrolyte 13 having a thickness of 100 μm.

In terms of the strength and the electrical conductivity, it is desired that the oxygen electrode 14 be as thick as possible. However, too thick an oxygen electrode is not preferable, because the gas diffusion resistance becomes unduly large in a large current density operation. The upper limit of 2,000 μm has been determined based on the above consideration.

To evidence the above phenomenon, FIG. 4 is presented which indicates that it is difficult for a gas to pass through a porous electrode and reach the solid electrolyte 13.

As described above, it is said that ordinarily the optimum sintering temperature of the YSZ film is about 1,400° C. However, it has been confirmed that a YSZ film can be provided that has, even with sintering at 1,300° C., a strength of 40 kgf/mm$^2$ (4-point flexural strength test), which is more than twice that of the conventional YSZ film by shaping a powder that is produced by uniformly mixing, aluminum alkoxide of 0.5–5 mol % in a slurry state into a YSZ powder (refer to Japanese Laid-Open Patent Appln. No. 6-219833). This means that LaSrMnO$_3$ (LSM) as the oxygen electrode material and YSZ, which have approximately the same thermal expansion coefficients, can be fired together.

That is, the invention can solve the problem that at 1,400° C. (the temperature at which the YSZ film is fired conventionally) it is not appropriate to shape LSM and YSZ together because of an insulating material of La$_2$Zr$_2$O$_7$ that is formed at the boundary therebetween. This has first made it possible to fire together a thin YSZ film and a thick oxygen electrode material.

With respect to the fuel electrode material that constitutes the fuel electrode, ordinarily used Ni/YSZ (wt % ratio: 60:40) can be fired easily without encountering a problem of reaction products such as occurs at the boundary between the oxygen electrode material and YSZ.

As a result, it becomes possible to shape together at least the solid electrolyte (YSZ) 13 and the oxygen electrode material, which in turn makes it possible to render the YSZ film not thicker than 100 μm. The cell structure can further be strengthened by forming the dimples 15A and 16B on both sides of the power generation layer 11.

Further, by thinning the YSZ film (5–100 μm), whose electrical conductivity is low, the power generation performance can be greatly improved.

It is noted that the present assignee has proposed forming dimples in the power generation layer (Japanese Laid-Open Utility Model Application No. 4-8259), and bonding the interconnector to the dimple protrusions with a conductive adhesive (Japanese Laid-Open Patent Application No. 6-215778), and also proposed the dimple shape (Japanese Patent Application No. 5-290266).

BRIEF DESCRIPTION OF THE DRAWINGS

FIG. 4 shows an I-V curve of the embodiment of the invention.

DESCRIPTION OF THE PREFERRED EMBODIMENTS

Figure 1:
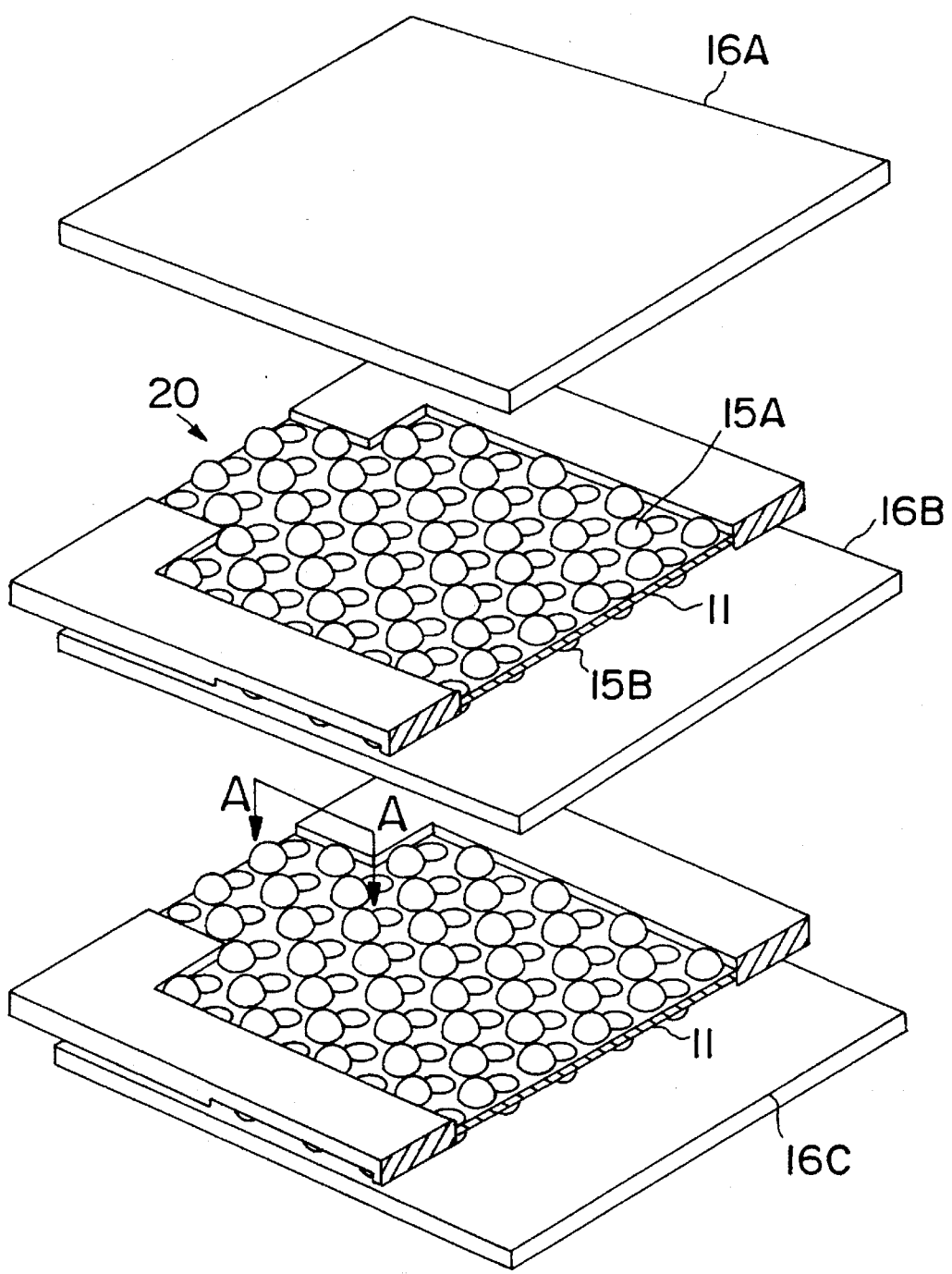
FIG. 1 is an exploded perspective view showing an example of a SOFC to which the present invention is applied.
Figure 2:
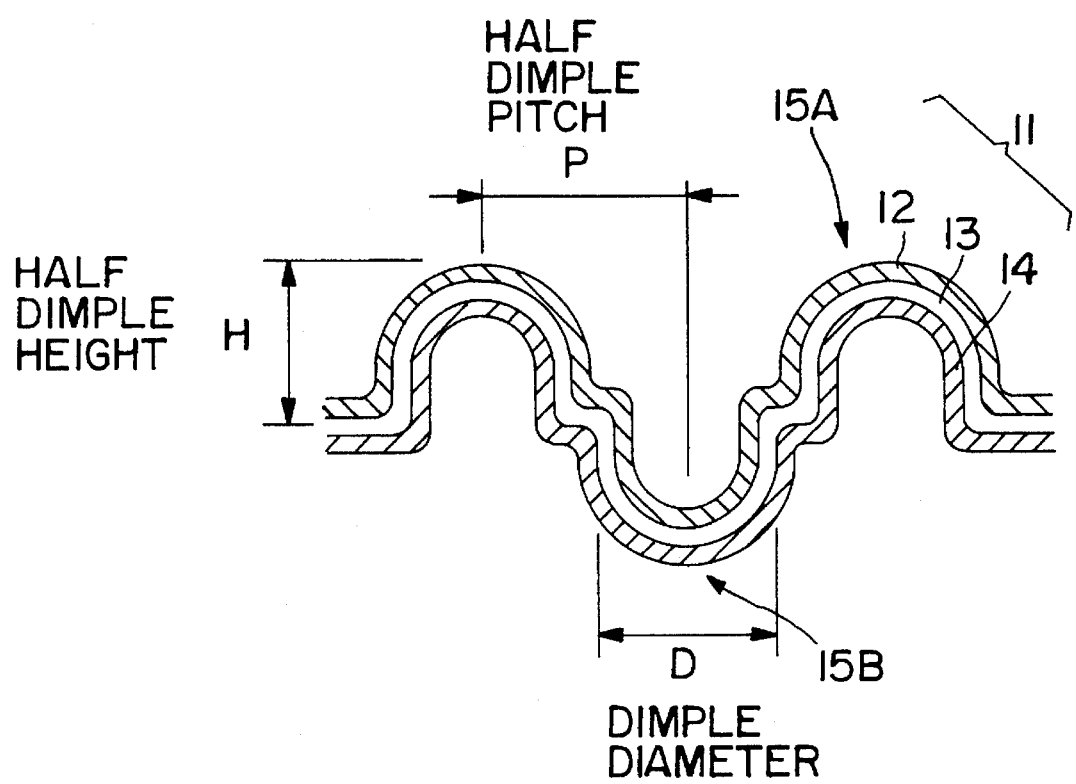
FIG. 2 is an enlarged sectional view taken along line A—A in FIG. 1.

Preferred embodiments of the present invention will be hereinafter described with reference to FIGS. 1 and 2.

In general, as for the components of the power generation film 11, the fuel electrode 12 is made of Ni/YSZ, NiCeO$_2$/YSZ, or a like material, the solid electrolyte 13 is made of YSZ, and the oxygen electrode 14 is made of LaSrMnO$_3$, LaCoO$_3$, or like material. The interconnectors 16A–16C are made of LaMgCrO$_3$ or a Ni-based refractory alloy.

In the present embodiments, to facilitate evaluation of shape-induced differences in performance, the following materials were used. Fuel electrode 12: Ni/YSZ (60:40); solid electrolyte 13: YSZ; oxygen electrode 14: LaSrMnO$_3$; and interconnectors 16A–16C: LaSrCrO$_3$.

Other fixed parameters that were used in experiments are as follows. The particle diameter of materials used for the fuel electrode material and the oxygen electrode material were 1.95 μm and 2.45 μm, respectively. The gas diffusion coefficient, i.e., (interstice ratio)/(bending degree ε/τ) in each of the electrodes was 0.02. The ratio of the degree of sintering, i.e., (sintering length)/(particle diameter), between each electrode and the solid electrolyte 13 was 0.04. The power generation atmosphere temperature of a cell accommodating the power generation film 11 was 1,000° C. Further, humidified hydrogen and air were supplied to the fuel electrode material (12) and the oxygen electrode material (14), respectively.

In the present embodiments, cells were produced in the following manner. Respective green sheets of YSZ for the solid electrolyte 13, the fuel electrode material (12) and the oxygen electrode (14) were formed by a doctor blade method. After the green sheets thus formed were laid one on another, dimples were formed on both sides of the power generation film 11 by using metal molds. Then, the power generation film 11 as a single piece was fired in a firing furnace at 1,300° C.

Performance tests were performed on four kinds of power generation films listed in Table 1 that were formed under the above-described conditions. Results are shown in FIG. 3.

TABLE 1

|  | Thickness of fuel electrode material (μm) | Thickness of oxygen electrode material (μm) | Thickness of YSZ (μm) | Total thickness (μm) |
| --- | --- | --- | --- | --- |
| Embodiment 1 | 50 | 50 | 200 | 300 |
| Embodiment 2 | 50 | 100 | 150 | 300 |
| Embodiment 3 | 50 | 150 | 100 | 300 |
| Embodiment 4 | 50 | 200 | 50 | 300 |

Figure 3:
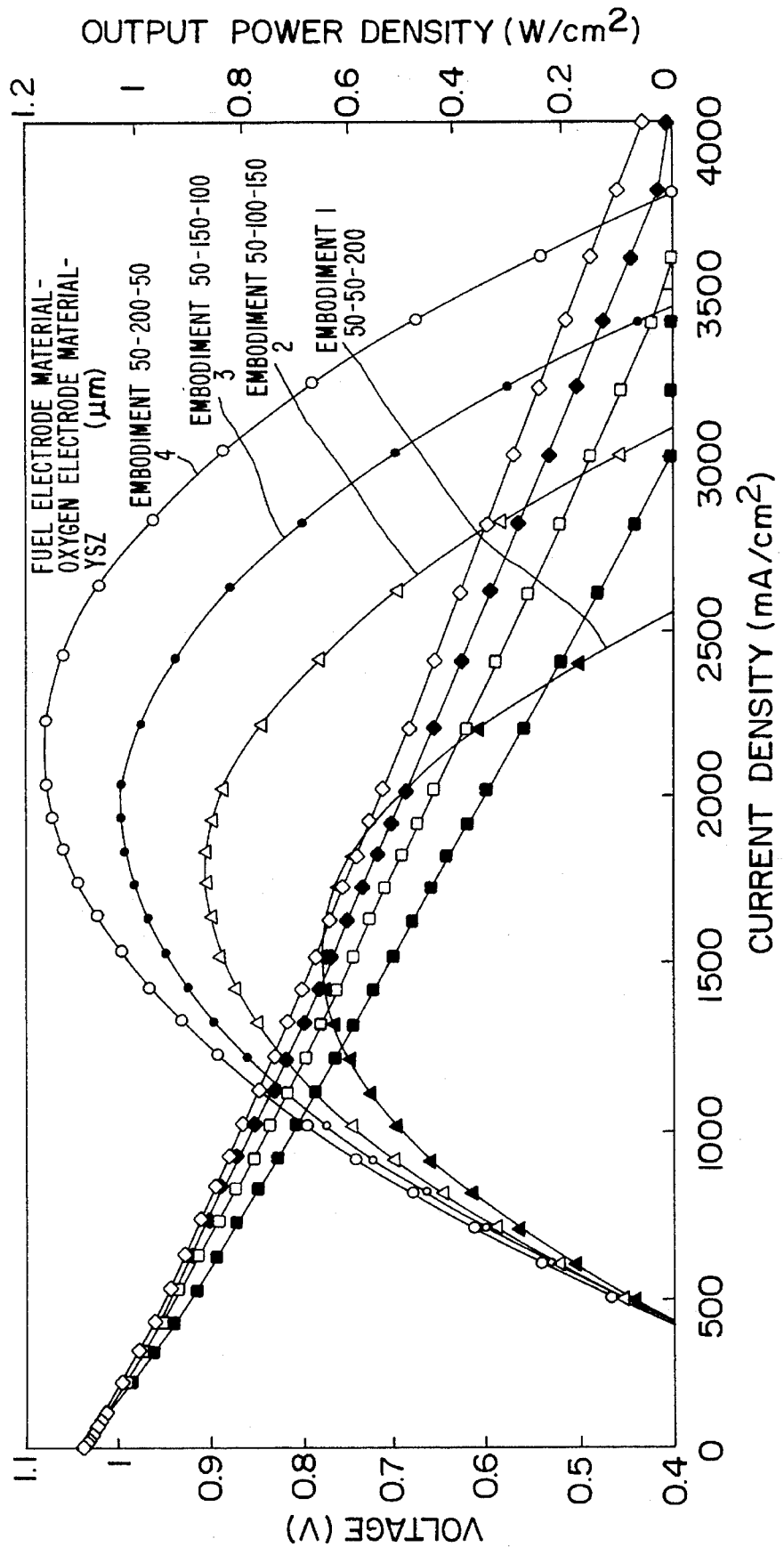
FIG. 3 is a graph showing power generation performance of an embodiment of the invention.

As shown in FIG. 3, it has been confirmed that the performance is greatly improved by thinning the YSZ film and thickening the oxygen electrode material (14).

Conventionally, the YSZ film (solid electrolyte 13) having a thickness of 50 μm needs to be handled very carefully. In contrast, in the present embodiments, since the oxygen electrode material has a flexural strength of about 10 kg/mm$^2$, a single body of the oxygen electrode material can provide sufficient ease of handling if it is 2,000 μm in thickness. It has become possible to provide the same strength and ease of handling as in the conventional cells by sintering together the three films of the power generation layer.

What is claimed is:

1. A solid oxide electrolyte fuel cell in which both surfaces of a power generation film comprising three layers of a fuel electrode layer, an yttria-stabilized zirconia solid electrolyte layer, and an oxygen electrode layer are formed with a number of dimples, wherein a thickness of the solid electrolyte layer is 5 to less than 100 μm, and wherein a thickness of the oxygen electrode layer, which is provided on one side of the solid electrolyte layer, is 200 to 2,000 μm, wherein the oxygen electrode layer supports the power generation film.

2. The solid oxide electrolyte fuel cell as in claim 1, wherein the thickness of the solid electrolyte layer is 5 to 50 μm.

* * * * *